United States Patent
Taylor et al.

(10) Patent No.: US 10,768,040 B2
(45) Date of Patent: Sep. 8, 2020

(54) TRANSFER AND WEIGHING DEVICE

(71) Applicant: LANARKSHIRE HEALTH BOARD, Bothwell (GB)

(72) Inventors: Gillian Taylor, Coatbridge (GB); Kenneth Hugh McCorkindale, Edinburgh (GB)

(73) Assignee: LANARKSHIRE HEALTH BOARD, Bothwell (GB)

( * ) Notice: Subject to any disclaimer, the term of this patent is extended or adjusted under 35 U.S.C. 154(b) by 202 days.

(21) Appl. No.: 15/771,895

(22) PCT Filed: Oct. 28, 2016

(86) PCT No.: PCT/GB2016/053360
§ 371 (c)(1),
(2) Date: Apr. 27, 2018

(87) PCT Pub. No.: WO2017/072527
PCT Pub. Date: May 4, 2017

(65) Prior Publication Data
US 2018/0313687 A1    Nov. 1, 2018

(30) Foreign Application Priority Data
Oct. 30, 2015   (GB) .................................. 1519251.1

(51) Int. Cl.
*G01G 19/44*   (2006.01)
*A61G 7/10*    (2006.01)

(52) U.S. Cl.
CPC .......... *G01G 19/445* (2013.01); *A61G 7/103* (2013.01); *A61G 2203/44* (2013.01)

(58) Field of Classification Search
CPC ...... G01G 19/445; G01G 19/44; A61G 7/103; A61G 2203/44
See application file for complete search history.

(56) References Cited

U.S. PATENT DOCUMENTS

| 4,363,368 A | 12/1982 | Paddon et al. |
| 6,386,051 B1 | 5/2002 | Yoshimi et al. |
| 7,199,311 B1 * | 4/2007 | Buckner, Jr. ............ A61G 1/04 177/144 |
| 8,892,203 B2 * | 11/2014 | Heinrichs ............ G01G 19/445 607/5 |

(Continued)

FOREIGN PATENT DOCUMENTS

EP    1 167 931 A2    1/2002

OTHER PUBLICATIONS

International Search Report and Written Opinion issued on PCT/GB2016/053360, dated Feb. 14, 2017.

(Continued)

*Primary Examiner* — Randy W Gibson
(74) *Attorney, Agent, or Firm* — Foley & Lardner LLP

(57) ABSTRACT

There is provided an apparatus to weigh a patient comprising a patient transfer board configured to support a patient in a supine position comprising at least 8 transducers, each transducer being provided 300 mm or less from another transducer. The transducers are provided at three or more positions across the width of the patient transfer board; wherein more than 45% of the transducers are provided 100 mm or less from an outer boundary of the patient transfer board.

16 Claims, 7 Drawing Sheets

Layout B

(56) References Cited

U.S. PATENT DOCUMENTS 9,766,116 B2 * 9/2017 Milne .................. G01G 19/44
2012/0259378 A1 10/2012 Heinrichs et al.
2014/0039351 A1 2/2014 Mix et al.

OTHER PUBLICATIONS

Gastopoulos et al., "Portable Weighing System," University of Pennsylvania, MEAM Senior Design Project: MEAM 446-2012-09, Apr. 27, 2012 (13 pages).

* cited by examiner

Layout B

Layout 1

Layout 2

Layout 3

Layout A

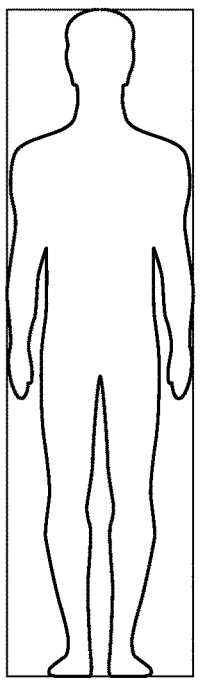 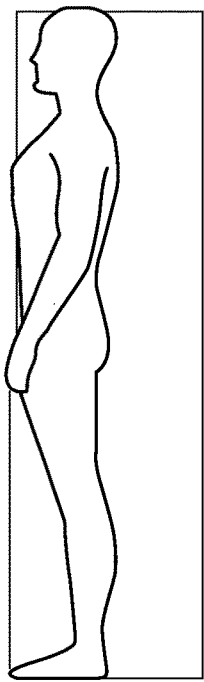 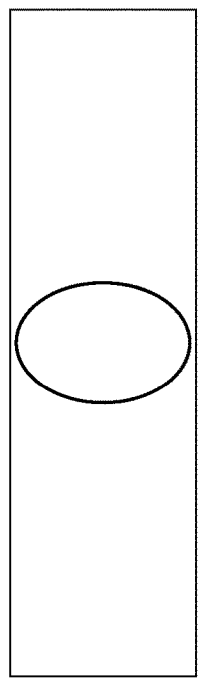 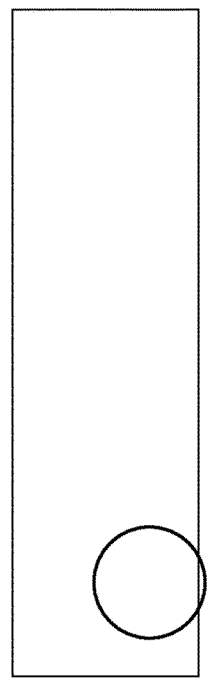
Laying flat    Laying on side    Sitting    Corner load
*Figure 12A*    *Figure 12B*    *Figure 12C*    *Figure 12D*

TRANSFER AND WEIGHING DEVICE

CROSS REFERENCE TO RELATED APPLICATIONS

The present application is a U.S. National Stage of International Application No. PCT/GB2016/053360 filed on Oct. 28, 2016, which claims priority from GB 1519251.1, filed on Oct. 30, 2015, the entire disclosures of which are incorporated herein by reference.

The present invention relates to a weighing device, in particular where the device is also suitable for transferring a patient to be weighed from one surface to another. The weighing device is generally suitable for use on soft, or non-horizontal surfaces. There is also provided a method of weighing a patient.

BACKGROUND TO THE INVENTION

The dose of many medicaments is dependent on the weight of the patient. However, it is currently difficult to measure a patient's weight quickly and accurately where they are unable to stand. The efficacy of drugs is reduced if the wrong dose is administered, and the risk of side-effects is increased.

Upon admission to hospital many patients are unable to support their own weight due to unconsciousness or due to suspected injury, in particular suspected back, neck or leg injuries. Moreover, where patients are admitted with chest pain or breathlessness, hospital procedure is for such patients to remain in a lying or sitting position. It is not possible for such patients to be weighed on conventional weighing scales as these require the patient to stand. Although weighing devices such as hoists are available in hospitals, these involve placing the patient in the hoist and lifting the patient off the bed/trolley in order for a weight to be taken. This is time consuming, requires suspending the patient, with consequent safety issues e.g. hoists can topple if not used appropriately. Alternatively, floor scales can be used which weigh both patient and trolley. Floor scales tend to be extremely heavy, thus non-portable, and need to be large enough to accommodate a trolley. Both the aforementioned methods require considerable space, which is often at a premium in hospital emergency areas.

Upon admissions into hospital, children's weight is typically estimated using generalized calculations dependent on the child's age. Weight is currently commonly estimated using the equation:

Weight (kg)=child's age+4×2.

However, the weight of children of the same age can greatly differ. This is an inaccurate method of calculating weight, and this can prove dangerous where such calculations are used to calculate doses of medicaments including opiates.

In addition, where there is limited or no access to scales or where drugs must be administered quickly, adult weights are also frequently estimated. Research has shown that these estimates are often inaccurate, particularly where medical staff are estimating the weight of a patient, rather than the patient providing an estimate of their own weight.

It is also difficult to measure a patient's weight when they refuse to keep still for periods during the weighing process, for instance where the patient is a child, or where the patient is confused, drunk and/or uncooperative.

Some medicaments must be administered within a maximum time from an event. For instance, the drug for stroke must be given within 4½ hours from the onset of symptoms, with the hospital standard in the UK as 1 hour from patient admission. Accordingly, time is of the essence during the admissions procedure. However, weighing procedures for patients who are unable to support their own weight can be lengthy. The use of a hoist is commonly associated with a weighing procedure of up to 15 minutes or longer. Providing a faster procedure for weighing suspected stroke victims would provide significant advantages. Furthermore, patients being admitted with a serious condition such as stroke are vulnerable and often fearful of what may happen next. To place such patients in a hoist can greatly add to their distress.

The patient transfer device PatSlide® is commonly used to transfer patients from one surface to another in hospitals, for instance from trolleys to beds. Other similar devices exist. This patient transfer device consists of a flexible sheet of plastic with good slip properties on its surface, enabling patients to be transferred smoothly and easily with minimal risk of back strain to hospital staff. The use of these devices in hospitals is a well-accepted and common procedure.

The weighing apparatus of the present invention provides a quick, accurate weight measurement for patients who cannot support their own weight and this may take place during the procedure of transferring the patient from one surface to another, for instance from a hospital trolley to a bed. The weighing apparatus of the present invention is thus particularly suitable for use in a hospital admissions ward where medicaments must be prescribed quickly, and such prescription is dependent on the weight of the patient. In hospital admissions wards, diagnosis has not yet occurred and a significant number of patients cannot support their own weight on conventional weighing apparatus.

STATEMENT OF INVENTION

According to an aspect of the present invention, there is provided an apparatus to weigh a patient comprising a patient transfer board configured to support a patient in a supine position, wherein an upper surface of the patient transfer board is configured to receive the supine patient, the upper surface having a width and a length;
   the patient transfer board comprising a plurality of transducers provided beneath the upper surface, said transducers configured to determine a weight of the patient,
   the apparatus comprising summing means configured to provide the summed weight sensed by the plurality of transducers,
   characterized in that the plurality of transducers includes at least 8 transducers, and each transducer is 300 mm or less from another of the transducers;
   the transducers are provided at three or more positions across the width of the patient transfer board;
   wherein more than 45% of the transducers are provided 100 mm or less from an outer boundary of the patient transfer board.

Generally, each transducer is no more than 270 mm from another of the transducers.

According to a first aspect of the present invention, there is provided an apparatus to weigh a patient comprising a patient transfer board configured to support a patient in a supine position, wherein an upper surface of the patient transfer board is configured to receive the supine patient, the upper surface having a width and a length,
   the patient transfer board comprising a plurality of transducers provided beneath the upper surface, said transducers configured to determine a weight of the patient, the apparatus comprising summing means configured to provide the summed weight sensed by the plurality of transducers, characterized in that at least one transducer is provided beneath every unit area of the area of the patient transfer board configured to receive the supine patient, wherein said unit area corresponds to 90,000 mm$^2$, the transducers are provided at three or more positions across the width of the patient transfer board;

wherein more than 45% of the transducers are provided 100 mm or less from an outer boundary of the patient transfer board.

According to a further aspect of the present invention, there is provided a method of weighing a patient including the steps of:

providing the apparatus as described herein, transferring the patient onto the upper surface of the patient transfer board, generally in a supine position, noting the summed weight provided by the summing means.

According to one embodiment, there is provided a method of transferring a patient from a first surface to a second surface using the apparatus provided herein comprising:

providing a first side of the patient transfer board on the first surface, and a second side of the patient transfer board on the second surface;

transferring the patient onto the upper surface of the patient transfer board, generally through sliding;

noting the summed weight provided by the summing means;

transferring the patient onto the second surface, generally through sliding;

removing the apparatus.

According to a further embodiment there is provided a kit of parts comprising any one of the weighing apparatuses as described herein and instructions for use. Where appropriate, teaching relating to any aspect or embodiment may relate to any other embodiment.

All numerical values provided incorporate 10% less than and 10% more than the numerical value provided.

DETAILED DESCRIPTION

Weighing Apparatus

According to a first aspect of the present invention, there is provided an apparatus to weigh a patient comprising a patient transfer board configured to support a patient in a supine position, wherein an upper surface of the patient transfer board is configured to receive the supine patient, the patient transfer board comprising a plurality of transducers provided beneath the upper surface, said transducers configured to determine a weight of the patient, the apparatus comprising summing means configured to provide the summed weight sensed by the plurality of transducers, characterized in that each transducer of the plurality of transducers is 300 mm or less from another of the transducers;

the transducers are provided at three or more positions across the width of the patient transfer board;

wherein more than 45% of the transducers are provided 100 mm or less from an outer boundary of the patient transfer board.

Suitably, around 50% of the transducers are provided 100 mm or less from an outer boundary of the patient transfer board.

According to one embodiment, more than 45% (generally around 50%) of the transducers are provided 80 mm or less from an outer boundary of the patient transfer board.

Typically, the plurality of transducers includes at least 8 transducers, and each transducer is no more than a distance of 270 mm from another of the transducers, generally no more than a distance of 250 mm from another of the transducers.

Generally, the transducers are provided at three or more positions across the width of the patient transfer board.

Suitably more than 50% of the transducers are provided 150 mm or less from an outer boundary of the patient transfer board.

According to an aspect of the present invention, there is provided an apparatus to weigh a patient comprising a patient transfer board configured to support a patient in a supine position, wherein an upper surface of the patient transfer board is configured to receive the supine patient, the upper surface having a width and a length the patient transfer board comprising a plurality of transducers provided beneath the upper surface, said transducers configured to determine a weight of the patient, the apparatus comprising summing means configured to provide the summed weight sensed by the plurality of transducers, characterized in that at least one transducer is provided beneath every unit area of the area of the patient transfer board configured to receive the supine patient, wherein said unit area corresponds to 90,000 mm$^2$, the transducers are provided at three or more positions across the width of the patient transfer board;

wherein more than 45% of the transducers are provided 100 mm or less from an outer boundary of the patient transfer board.

Generally, the transducers are provided at three or more positions across the width of the patient transfer board.

Suitably more than 50% of the transducers are provided 150 mm or less from an outer boundary of the patient transfer board.

The apparatus of the present invention is configured to provide the dual functions of patient transfer device and weighing device. To achieve this dual functionality, the apparatus must combine accuracy in weighing with a relatively low weight and a relatively low maximum thickness. In addition, the lateral edge height of the apparatus is generally relatively low to allow easy movement of a patient onto and from the apparatus.

The apparatus of the present invention allows a weight measurement to be provided quickly and accurately for patients who are unable to support their own weight, for instance because of suspected back, neck or leg injuries, breathlessness dizziness or unconsciousness. This is particularly advantageous in the admissions department of hospitals, allowing medicine to be prescribed at the correct dose quickly and accurately. The dose of many medicines is dependent on the weight of the patient to be treated. If the incorrect dose is determined due to inaccuracies in the weighing method, the efficacy of the medicine may be adversely affected and the risk of adverse side effects will generally increase. Drugs such as gentamicin may cause significant harm if a patient is overdosed.

These arrangements promote accurate weighing on soft or non-horizontal surfaces, and this is particularly advantageous in a hospital setting where patients may be weighed during transfer between beds or trolleys. These arrangements also allow weighing of patients who will not lie still for any significant length of time and this is of particular use in the weighing of children and patients who are confused due to, for example a medical condition or through intoxication through drugs or alcohol.

The upper surface of the patient transfer board should generally be freely supported on the plurality of transducers to enable accurate measurement of forces applied to the upper surface.

Where the patient transfer board includes at least one transducer every unit area (generally every 160,000 mm$^2$ portion, suitably every 122,500 mm$^2$ portion) of its surface, the accurate measurement of a patient's weight is not dependent on the patient's position on the patient transfer board. This allows the weighing of patients who are not provided centrally on the patient transfer board, for instance on an edge of the patient transfer board. This is more likely where a patient is weighed during transfer from one surface to another.

Generally, the unit areas provided above are substantially square, or substantially circular. Alternatively, the unit areas may be rectangular or oval, generally the width of the rectangular/oval unit areas is no less than half of the length of the rectangular/oval unit areas.

The provision of transducers spaced within a maximum distance from one another (generally within 400 mm from one another, suitably within 300 mm from one another, more suitably within 250 mm from one another) allows the possibility of a less rigid material to be used (having a lower flexural modulus) for the upper surface of the patient transfer board. This promotes patient comfort, and also provides ease of transfer between surfaces, including surfaces at different heights.

Including a plurality of transducers and providing the transducers in the claimed arrangements ensures optimal weighing accuracy.

Generally, the patient transfer board of the present invention includes at least 8 transducers, in particular where the patient weighs more than 60 kg. However, where the apparatus is used for the weighing of relatively light patients such as children, 6 transducers may in some embodiments be suitable, in particular if the patients weigh less than 20 kg.

According to one embodiment, the patient transfer board of the present invention includes 10 or more transducers; generally, 10 to 14 transducers, suitably 12 transducers.

According to a further embodiment, the patient transfer board includes 14 to 20 transducers; suitably 14 to 18 transducers; more suitably 15 or 16 transducers.

According to one embodiment, each transducer is no more than a distance corresponding to 50% of the width of the upper surface, generally no more than 40% of the width of the upper surface of the patient transfer board.

Generally, each transducer is no more than a distance corresponding to 60% (typically no more than 50%, suitably no more than 40%) of the average width of the upper surface of the patient transfer board configured to receive the supine patient from another transducer.

Alternatively, each transducer is no more than a distance corresponding to 60% (typically no more than 50%, suitably no more than 40%) of the maximum width of the upper surface of the patient transfer board configured to receive the supine patient from another transducer.

Typically, the patient transfer board is generally rectangular or oval in shape, and the width of the patient transfer board does not significantly alter along its length.

According to one embodiment, the area of the patient transfer board configured to receive the supine patient comprises at least one transducer every unit area, said unit area corresponding to 60% of the width of the upper surface of the patient transfer board squared, generally to 50% of the width of the upper surface squared, typically 40% of the width of the upper surface squared.

Generally, the unit area corresponds to 60% (typically no more than 50%, suitably no more than 40%) of the average width of the upper surface of the patient transfer board squared.

Alternatively, the unit area corresponds to 60% (typically no more than 50%, suitably no more than 40%) of the maximum width of the upper surface of the patient transfer board squared.

The apparatus includes a patient transfer board, including transducers configured to determine the weight of a patient through forces applied to the upper surface of the patient transfer board. The apparatus generally also includes a surround, extending around each lateral outside boundary, or side of the patient transfer board, generally also extending around each longitudinal outside boundary or end of the patient transfer board. The transducers are not configured to measure forces applied to the surround. The surround is generally sloped from the outer boundary of the patient transfer board towards the horizontal, to provide a lower edge height or thickness compared to the outer boundary of the patient transfer board.

According to one embodiment, the lateral outside boundary of the apparatus has a thickness of 2.5 cm or less, typically 2 cm or less, generally around 1 cm or less.

The patient transfer board generally includes an end towards which the patient places their head during the weighing procedure. The patient transfer board may include an end or portion towards one end configured to receive the patient's head during the weighing procedure. This is advantageous as the half of the patient including the head is heaviest.

According to one embodiment, 60% or more of the transducers are provided within the half of the length of the patient transfer board extending from the end configured to receive the patient's head during use; generally, 65% or more; typically, 60 to 70% of the transducers are provided within 50% of the length of the patient transfer board extending from the end configured to receive the patient's head during use.

Alternatively, the transducers may be relatively evenly distributed along the length of the patient transfer board.

According to one embodiment, 50% or more (generally more than 50%) of the transducers are provided towards the outer boundary of the patient transfer board, generally within the outer 30% of the width of the patient transfer board, and/or towards the outer 10% of the length of the patient transfer board; typically, more than 60% of the transducers; suitably more than 70% of the transducers. For instance, where the patient transfer board is 600 mm wide, 50% or more of the transducers are generally provided within 200 mm from a first side, or within 200 mm of the second side.

Typically, more than 50% of the transducers are provided within the 30% of the width closest to each side of the upper surface of the patient transfer board; generally, within the 20% of the width closest to each side of the upper surface of the patient transfer board. Generally, 60% or more of the transducers are provided within the 20% of the width closest to each side of the upper surface of the patient transfer board, suitably 70% or more of the transducers.

Typically, 40% or more of the transducers are provided within the outer 20% of the length of the patient transfer board; generally, 45% or more; suitably 50% or more within the outer 20% of the length of the patient transfer board.

According to one embodiment, around 50% of the transducers are provided within the outer 18% of the length of the patient transfer board. According to one embodiment, the apparatus is configured to weigh an adult human and at least one transducer is provided within 400 mm of an outer boundary, circumference or side of the patient transfer board. Typically, each lateral outside boundary, or side of the patient transfer board is within 400 mm of at least one transducer. Suitably each longitudinal outside boundary or end of the patient transfer board is within 600 mm of at least one transducer.

Generally, 50% or more of the transducers are provided within 150 mm of the outer boundary of the upper surface of the patient transfer board, typically 55% or more of the transducers, suitably 60% or more of the transducers.

According to one embodiment, more than 25% of the transducers are provided from 100 mm or less (generally from 85 mm or less) from a lateral outside boundary or side of the patient transfer board, typically 30% or more of the transducers, suitably 40% or more of the transducers, typically 45% or more of the transducers, suitably around 50% of the transducers.

Typically, 15% or more of the transducers are provided within the outer 10% of the length of the patient transfer board; generally, within the outer 6 to 8% of the length of the patient transfer board. Generally, 20% or more of the transducers are provided within the outer 10% of the length of the patient transfer board, suitably 25% or more of the transducers.

Suitably more than 10% of the transducers are provided from 200 mm or less, generally from 150 mm or less of a longitudinal outside boundary or end of the patient transfer board; generally, 20% or more; typically, around 25% of the transducers.

According to one embodiment, each transducer is no more than 400 mm from another of the transducers, generally no more than 350 mm, typically no more than 300 mm, suitably no more than around 250 mm from another transducer.

According to one embodiment, the apparatus includes a patient transfer board, where at least one transducer is provided beneath each 160,000 mm$^2$ portion of the upper surface of the patient transfer board configured to receive the supine patient, generally at least one transducer beneath each 122,500 mm$^2$ portion of the patient transfer board configured to receive the supine patient, typically at least one transducer beneath each 90,000 mm$^2$ portion of the patient transfer board configured to receive the supine patient.

According to one embodiment, the transducers are provided at two or three positions across the width of the patient transfer board, suitably three positions, more suitably three or more positions, generally at least four positions, typically 5 or 6 positions across the width of the patient transfer board.

According to one embodiment, the transducers are provided at seven or more positions along the length of the patient transfer board, generally at least eight positions, typically eight to ten positions along the length of the patient transfer board, suitably ten or eleven positions.

The provision of a plurality of transducers, positioned relatively close to each other (generally less than 400 mm from each other, suitably less than 300 mm from each other) allows the upper surface to be formed from a material having lower associated rigidity, this promotes patient comfort and some degree of flex facilitates ease of patient transfer across the upper surface and ease of sliding. Due to the transducer arrangement of the present invention, the upper surface does not touch the lower surface of the patient transfer board even where a more flexible material is used.

According to one embodiment, the upper surface of the patient transfer board has an associated flexural modulus of at least 8 GPa. Suitably the upper surface of the patient transfer board has an associated flexural modulus of less than 25 GPa. Suitably the lower surface of the patient transfer board has a higher associated rigidity than the upper surface.

The inventors overcame numerous problems in providing a patient transfer and weighing device having an associated weight low enough to allow it to be handled by one medical practitioner whilst also maintaining the accuracy of the weighing procedure. As the weight is related to the thickness of the apparatus, this must also be a consideration.

According to one embodiment, the present invention provides a patient transfer and weighing apparatus configured for use with an adult human having an associated accuracy of +/−200 g (generally +/−150 g) for weights from 10 kg to 150 kg, a weight of less than 11 kg, generally less than 10.5 kg, suitably less than 9 kg, typically less than about 8 kg) and a maximum thickness of less than 5 cm, suitably less than 3 cm (generally around 2.5 cm). Typically, the apparatus includes at least 8 transducers, typically at least 10 transducers, generally 10 to 12 transducers.

Generally, the apparatus of the present invention has a density of less than 400 kg/m$^3$, generally less than 350 kg/m$^3$, suitably less than 320 kg/m$^3$, more suitably around 300 kg/m$^3$. By ensuring that the apparatus of the present invention has a relatively low density, the inventors have ensured that one medical practitioner can safely handle the apparatus quickly, easily and without undue effort. This is important in an emergency setting.

Where the apparatus is configured to weigh an adult human, it suitably weighs less than 15 kg, generally less than 13 kg; typically, around 11 kg. According to one embodiment, the apparatus weights less than 9 kg, suitably from 7.5 to 8 kg.

Where the apparatus is configured to weigh a human child, it suitably weighs less than 6 kg, generally less than 5 kg. However, generally a child will be weighed on the same apparatus as an adult.

The apparatus of the present invention is suitably configured to measure weights of 10 to 150 kg at an accuracy of +/−300 g; typically, +/−200 g; suitably +/−150 g.

According to one embodiment, the apparatus of the present invention is configured to weigh an adult human and a child human. The apparatus of the present invention is generally suitable to weigh children from 12 months.

This is generally achieved by ensuring that the apparatus is sensitive enough to obtain an accurate reading when the weight of the patient is spread over only some of the transducers. Generally, an accurate measurement is achievable where the weight of the patient is spread over 75% or more, typically 50% or more, suitably 25% or more of the transducers. This is advantageous in the weighing of children, as well as in the weighing of patients who are unable or unwilling to stay still during the weighing procedure, or for the weighing of patients who are not positioned centrally on the patient transfer board.

The maximum thickness of the apparatus does not generally exceed 5 cm and is generally 2 to 3 cm. However, the thickness of the apparatus at its lateral outside boundary is generally less than half of the maximum thickness. Generally, the thickness of the apparatus at its lateral outside boundary is 0.5 to 3 cm, typically 1 to 3 cm. According to one embodiment, the thickness of the apparatus at its lateral outside boundary is 0.5 to 1.5 cm, generally 0.5 to 1 cm, suitably around 0.5 cm.

The lateral outside boundary of the apparatus of the present invention generally has a thickness of 2 cm or less, preferably 1 cm or less. This is generally achieved through the provision of a surround extending around each lateral outside boundary, or side of the patient transfer board, generally also extending around each longitudinal outside boundary or end of the patient transfer board. There are generally no transducers provided beneath the upper surface of the surround and the transducers are not generally configured to measure forces applied to the surround. The surround is generally sloped from the outer boundary of the patient transfer board towards the horizontal, to provide a lower height edge compared to the outer boundary of the patient transfer board. This facilitates ease of patient transfer onto and off of the apparatus, in particular ease of sliding.

As noted above, the apparatus of the present invention is generally configured for use in the transfer of patients from one surface to another, as well as for weighing. To facilitate ease of transfer, the coefficient of friction of the upper layer of the apparatus is generally 0.2 or less.

Alternatively, the coefficient of friction of the upper surface of the apparatus may be higher than provided above, and ease of transfer across the apparatus may be facilitated through the use of a slide sheet, comprising a low friction surface. The slide sheet may be removable or comprise part of the apparatus.

The lower surface of the apparatus may include non-slip or non-skid areas having a high friction coefficient to reduce the risk of the apparatus slipping during the transfer/weighing procedure.

The apparatus of the present invention is generally X-ray translucent and static insulative. The apparatus is generally completely enclosed with no gaps to promote ease of cleaning and infection control.

The apparatus of the present invention generally provides a measurement of the summed weight of the patient within 2 seconds of the patient being placed or slid onto the patient transfer board.

Where the apparatus is configured for weighing a human adult, the apparatus generally has an associated length of 150 to 200 cm, and an associated width of 40 to 90 cm, generally around 70 cm. The apparatus generally includes the patient transfer board and a surround at both sides of the patient transfer board. The surround generally extends less than 150 mm from the sides of the patient transfer board, typically around 100 mm from both of the sides of the patient transfer board.

The patient transfer board is generally elongated and flat. Generally, the patient transfer board provides a flat surface for the patient to be slid onto. The upper surface of the patient transfer board may flex, but is not generally concave when the patient is removed. This assists in the transfer of the patient off the apparatus.

The apparatus of the present invention is generally for use in a hospital.

The apparatus generally includes handles to promote ease of handling.

There are not suitably any sharp edges or protrusions on the apparatus of the present invention.

According to one embodiment, the apparatus of the present invention may be provided in more than one piece to allow for easy transport. In such embodiments, the pieces may be connected together prior to use. Alternatively, the apparatus may be folded to allow it to be transported more easily. Such embodiments would allow the apparatus to be used, for instance with patients in community settings, including those that are bed bound and/or obese.

The patient transfer board may be formed from any suitable material. Particular mention may be made of carbon fibre, fiberglass, honeycomb aluminium, metallic alloys and plastics material. The outer surfaces of the patient transfer board, and surround are generally covered with a vinyl or plastic layer.

The skilled man will be well aware of many different transducers which may be used. Mention may be made of torsion, tension and compression load cells. Generally, the transducers are electronic. The transducers may be strain gauges. Alternatively, or additionally the transducers may be pneumatic or hydraulic.

Generally, the apparatus includes a single type of transducer. Alternatively, one or more different types of transducer may be used.

The summing means receives signals from each of the transducers and produces a signal corresponding to the sum of the weight sensed by all of the transducers. Generally, the transducers communicate with the summing means electronically, generally through wired connection.

Typically, the summed weight is displayed by a digital display provided on the apparatus, and in communication with the summing means. Generally, the weight of the patient is summed and displayed within 5 seconds of the patient being placed or transferred onto the apparatus, typically less than 3 seconds, suitably less than 2 seconds.

The summed weight is displayed by a digital display on the apparatus or can be displayed remotely on other devices, suitably through wireless connections such as Bluetooth®.

The apparatus may be powered by battery, and the apparatus may include an indication of the extent to which the apparatus is charged, and optionally an alert to notify the user that the battery power is low.

Although generally configured to transfer/weigh humans, according to one embodiment, the apparatus of the present invention may be used for other subjects, in particular animals such as dogs and cats.

Method

According to a further aspect of the present invention, there is provided a method of weighing a patient including the steps of:
  providing the apparatus as described herein,
  transferring the patient onto the upper surface of the patient transfer board, generally in a supine position,
  noting the summed weight provided by the summing means.

In order to ensure an accurate measurement, the patient should be supported entirely by the apparatus during the weighing procedure. Where the patient is transferred onto the apparatus through the help of others (for instance, medical practitioners), all physical support should be withdrawn during the weighing procedure. The patient may place their hands across their chests during the weighing procedure.

According to one embodiment, there is provided a method of transferring a patient from a first surface to a second surface using the apparatus provided herein comprising:
  providing a first side of the patient transfer board on the first surface, and a second side of the patient transfer board on the second surface;
  transferring the patient onto the upper surface of the patient transfer board, generally through sliding;
  noting the summed weight provided by the summing means;

transferring the patient onto the second surface, generally through sliding;

removing the apparatus.

Typically, the patient provided on the upper surface of patient transfer board for at least 2 secs, generally at least 5 seconds. According to best medical practice, there is a pause between transferring patients onto a patient transfer device and transferring them off. This is to ensure that the patient doesn't have too much momentum upon transfer to the second surface, especially where the second surface is lower than the first. The weight of the patient could be measured during this pause.

Prior to transfer procedure, the first and second surfaces should be aligned as much as possible, and where either of the surfaces are easily movable, any brakes should be applied. Generally, the patient is tilted slightly to one side to allow the first side of the patient transfer board to be placed partially under the patient.

The apparatus of the present invention spans the first and second surfaces, providing a smooth bridge, spanning any gaps or differences in height between the two surfaces.

The apparatus of the present invention provides the dual functionality of patient transfer, and patient weighing. This allows the patient's weight to be measured quickly and easily during the normal procedures which the patient would undergo during admission into hospital.

Medicines can be prescribed accurately in accordance with the patient's weight. In addition, the patient's weight can be monitored over prolonged timescales and this can screen for malnutrition.

Kit of Parts

According to a further aspect of the present invention there is provided a kit of parts comprising the apparatus as described herein, and instructions for use.

The apparatus is generally calibrated prior to being packaged in the kit of parts, and is used within 3 years of calibration.

Alternatively, or additionally, the instructions may include instructions for calibrating the apparatus prior to use.

The kit of parts generally includes charging means.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Throughout the description and claims of this specification, the words "comprise" and "contain" and variations of the words, for example "comprising" and "comprises", mean "including but not limited to", and are not intended to (and do not) exclude other moieties, additives, components, integers or steps. All documents referred to herein are incorporated by reference.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

Further aspects and embodiments of the invention are set forth in the following description and claims.

The present invention is further described by way of example only with reference to the accompanying Figures in which:

FIG. 1 provides a schematic plan representation of an embodiment of the apparatus of the present invention configured for use with an adult human;

FIG. 2 provides a schematic representation of the transducer arrangement of an embodiment of the apparatus of the present invention configured for use with an adult human where the measurements provided are in mm;

FIGS. 3A to 3D provide schematic representations of an embodiment of the apparatus of the present invention including details of different loads applied to test the accuracy of patient transfer boards with different load distributions;

Figure 8:
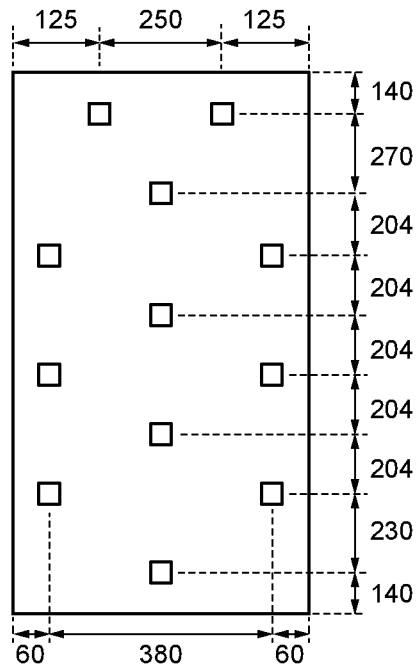
Figure 9:
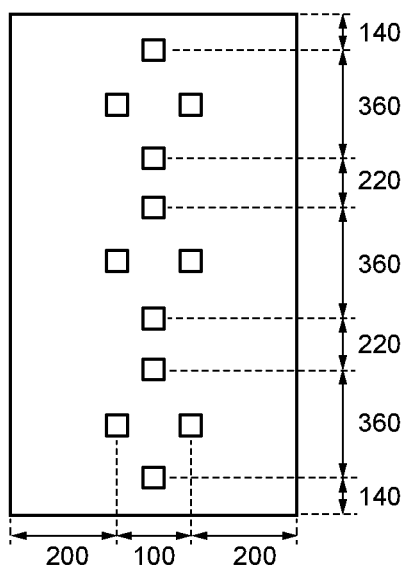
Figure 10:
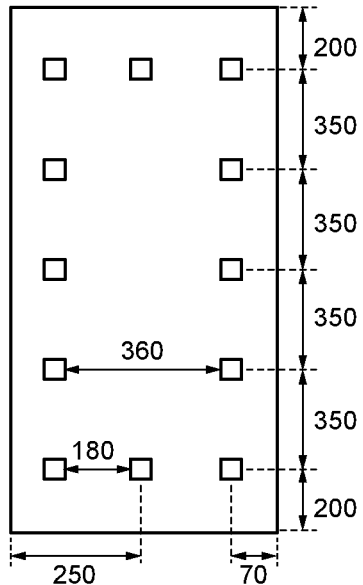
Figure 11:
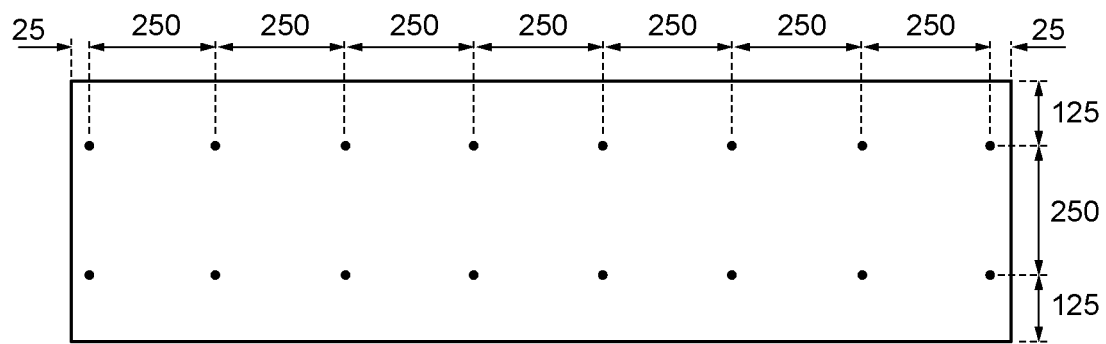

FIG. 8 provides a schematic representation of the transducer arrangement of an embodiment of the apparatus of the present invention configured for use with an adult human where the measurements provided are in mm;

FIG. 9 provides a schematic representation of the transducer arrangement of a patient transfer board configured for use with an adult human where the measurements provided are in mm;

FIG. 10 provides a schematic representation of the transducer arrangement of a patient transfer board configured for use with an adult human where the measurements provided are in mm FIG. 11 provides a schematic representation of the transducer arrangement of a patient transfer board configured for use with an adult human where the measurements provided are in mm;

FIG. 12A to D provide schematic representations of a patient transfer board including details of different loads applied to test the accuracy of patient transfer boards with different load distributions.

Figure 1:
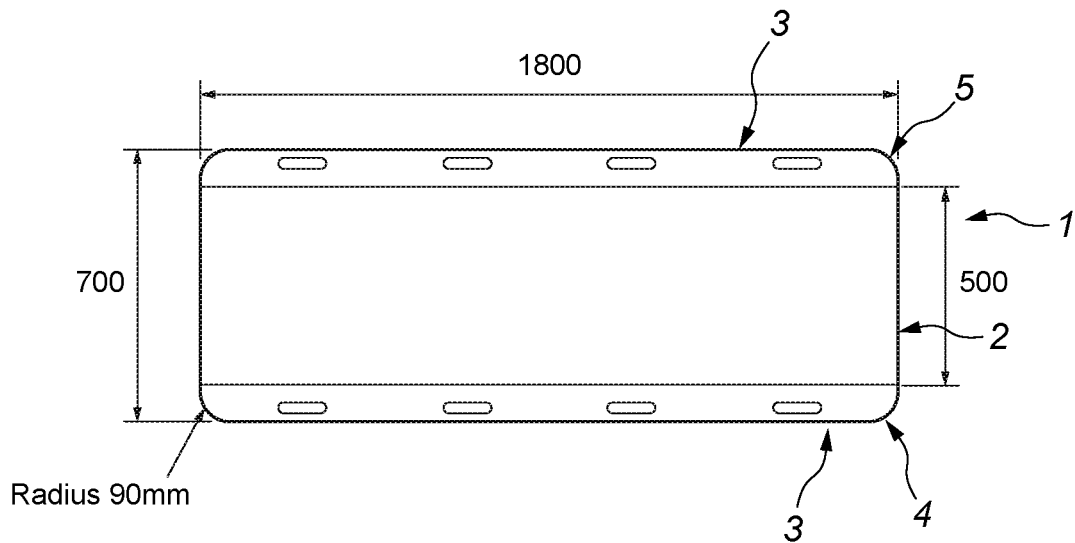

FIG. 1 shows a plan view of a preferred embodiment of the apparatus of the present invention, shown generally at 1, including a patient transfer board 2 and a surround 3. The patient transfer board 2 includes a plurality of transducers provided under the upper sheet. No transducers are provided under the surround 3. The surround is provided along the lateral sides of the patient transfer board. The corners of the surround 4, 5 are rounded. Four handles are provided at spaced intervals along each side of the surround.

Figure 2:
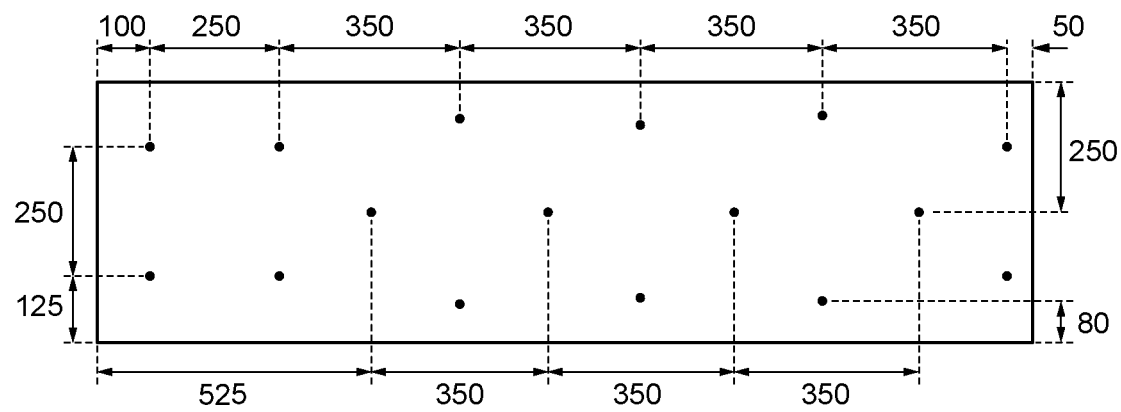

FIG. 2 shows a schematic representation of a preferred transducer arrangement of the apparatus of the present invention. Each unit area of the upper surface of the apparatus of 90,000 mm² includes at least one transducer. Each transducer is spaced no more than 300 mm from another of the transducers.

Figure 3A:
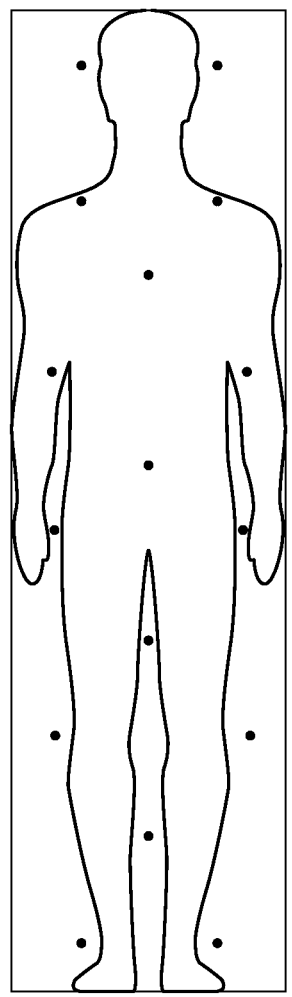

The accuracy of the apparatus of the present invention including the transducer arrangement illustrated in FIG. 2 was tested by applying the weight of a human adult across the majority of the length and the majority of the width of the patient transfer board as shown in FIG. 3A. This was repeated with a human adult of different weight. The apparatus provided an accurate measurement of the weight in both cases: 90.15 applied, 89.7 measured and 51.35 applied, 51.34 measured.

Figure 3B:
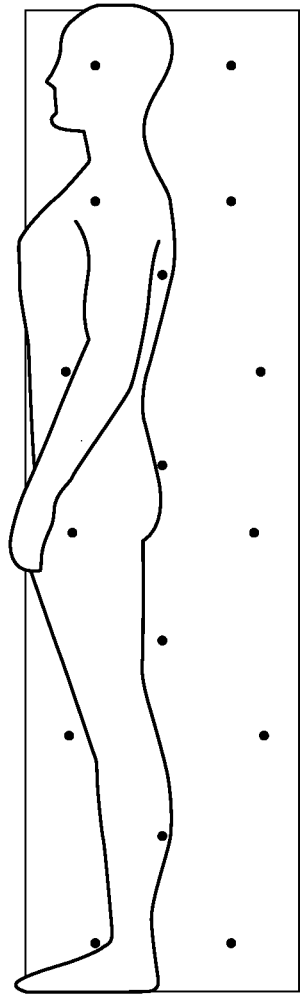

The accuracy of the apparatus of the present invention including the illustrated transducer arrangement was then tested where the weight of a human adult was applied to one side of the patient transfer board, above around half of the transducers provided, as shown in FIG. 3B. This was repeated with a human adult of different weight. The apparatus provided an accurate measurement of the weight in both cases: 90.15 applied, 89.68 measured and 51.35 applied, 51.4 measured.

Figure 3C:
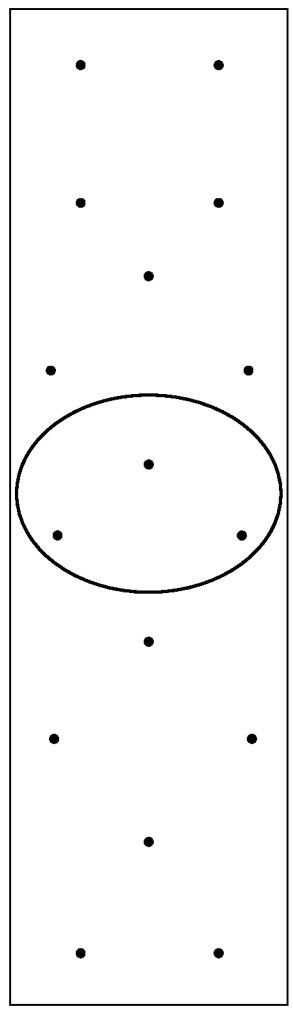
Figure 3D:
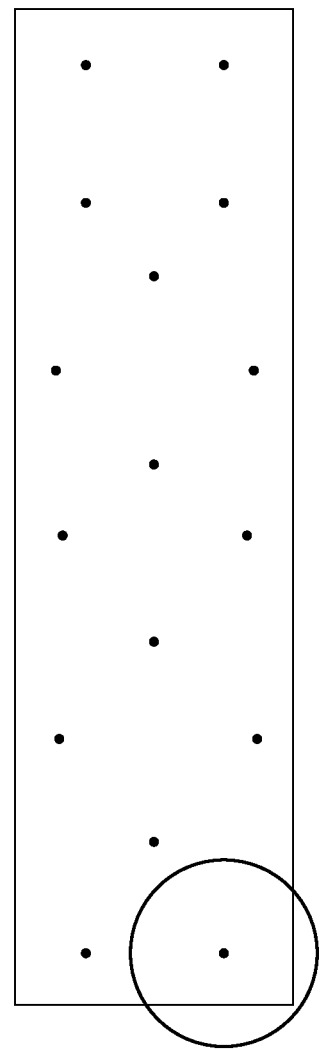
Figure 4:
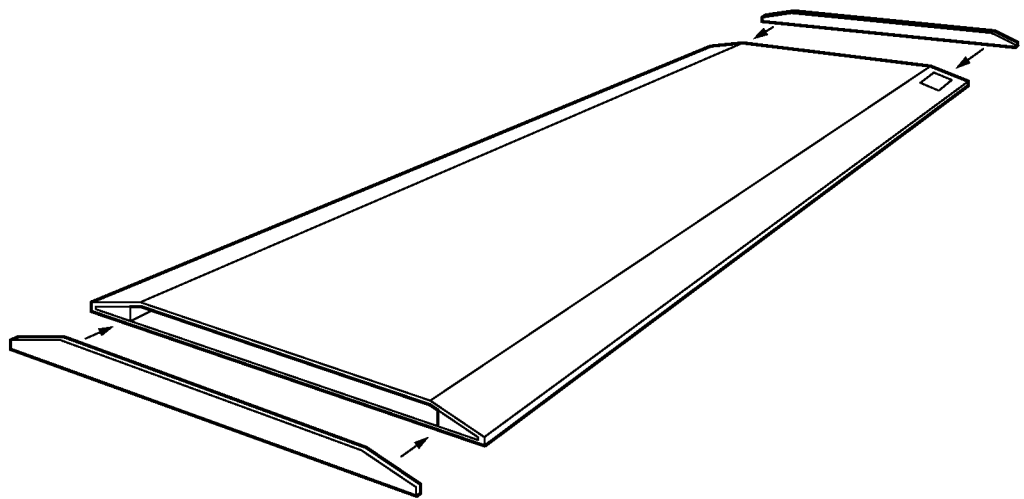
FIG. 4 shows a partially exploded view of an embodiment of the apparatus of the present invention.
Figure 5:
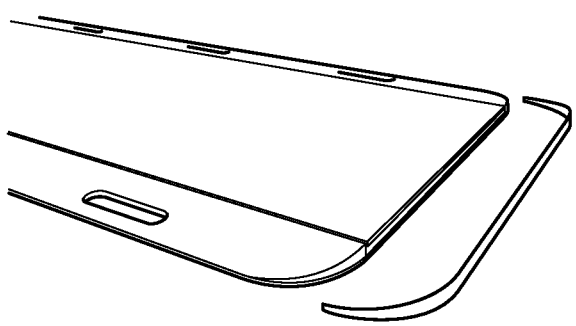
FIG. 5 shows a partially exploded view of an embodiment of the apparatus of the present invention.
Figure 6:
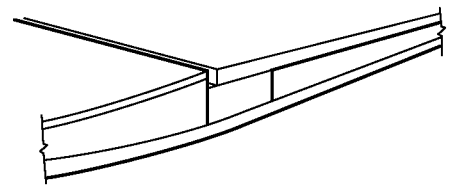
FIG. 6 shows a cross-section through an embodiment of the apparatus of the present invention.

The weight of a human adult was then applied to an area over just three transducers, as shown in FIG. 3C and then repeated with a human adult of different weight. The apparatus provided an accurate measurement of the weight in both cases: 90.15 applied, 89.46 measured and 51.35 applied, 51.36 measured. Finally, the weight of a human adult was applied to an area over just one transducer, as shown in FIG. 3D, and then repeated with a human adult of different weight. The apparatus nonetheless provided an accurate measurement of the weight in both cases: 90.15 applied, 89.3 measured and 51.35 applied, 51.38 measured.

Figure 7:
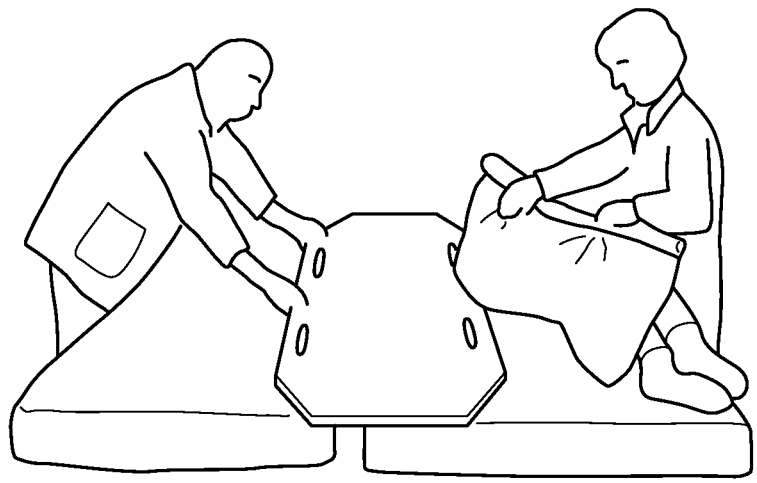
FIG. 7 illustrates an embodiment of the apparatus of the present invention in use.

Typically, the apparatus of the present invention may be produced according to the steps detailed below. A lower panel of the patient transfer board is provided, suitably formed from a rectangular piece of carbon fibre or plastic. A surround is provided on either side of the patient transfer board, and is glued or mounted into place. The surround may be formed from expanded polystyrene foam, and typically has a width of around 100 mm. The surround slopes towards the horizontal, so that the height of the apparatus at the outer lateral boundary is at a minimum. The corners of the composite may be rounded, and handles may be provided. A plurality of transducers is provided on the lower panel of the patient transfer board, generally through gluing or mounting transducer supports to the lower panel and then gluing or mounting the transducers onto the supports. Spacer disks may be used on an upper surface of the transducers. End caps may be provided at both ends of the lower panel, to protect the inner workings of the patient transfer board, and to ensure the finished apparatus is suitable for medical use. The transducers are each connected to one or more summing means, typically through wires. Where more than one summing means is provided, the summing means are connected, typically in series. Weight distribution plates are generally provided on the upper panel of the patient transfer board in the same layout as the transducers. The lower and upper panels may be covered with a protective sheet, for instance formed from vinyl. The upper panel is then provided on top of the lower panel, and secured into place. The apparatus is then calibrated. FIG. 7 illustrates the patient transfer board of the present invention in use. The patient is provided initially on a trolley which is placed next to a bed. All brakes on the trolley and on the bed are applied. The patient is rolled onto their side, the patient transfer board is provided, bridging the gap between the trolley and a bed. The patient is rolled onto one side of the patient transfer board, and then slid fully onto the patient transfer board, so that their entire weight is supported by the patient transfer board. A measurement of their weight is taken before the patient is slid to the other side of the patient transfer board. The patient may then be rolled off the patient transfer board onto the bed. Alternatively, the patient transfer board may facilitate transfer from a bed to a trolley, another bed, or may be used to obtain a measurement of the weight of the patient before the patient is transferred back to the bed or trolley upon which they were initially provided.

Example 1

A first prototype was prepared using a carbon fibre base, an array of transducers in load cell layout A as illustrated in FIG. 11 and a carbon fibre top. A second prototype was provided using a carbon fibre base, an array of transducers in load cell layout B as illustrated in FIG. 2 and a carbon fibre top.

The accuracy of the weight measurement provided by the prototypes was tested, initially on a hard surface (the floor). Four different positions of the weight on the prototypes was tested, the four different loadings illustrated in FIG. 3A to D.

A calibrated, body shaped load was weighed on the prototypes. For each load tested, the head of the body shaped load was placed in the same position on the prototypes.

The following loads were weighted: 10 kg, 50 kg, 100 kg and 150 kg. Each test was repeated five times. The accuracy of the weight measurements of the prototypes was checked and recorded and the results are provided in Table A.

The results provided in Table A evidence the accuracy and reproducibility of devices including two different load cell layouts. The greatest percentage variation to applied load is significantly higher for Layout A (1.56%) than for Layout B (0.94%, or 0.4% during retest).

Example 2

Test Materials and Parts Patient transfer boards having the load cell layout 1, 2 and 3 as illustrated in FIGS. 8 to 10 were prepared.

12 load cells were used in each layout together with a single controller box to collate and sum the outputs from the 12 sensors. Each load cell was supported by a custom U shaped support in 6 mm Plywood. Each load cell had a 5 mm×12 mm hexagonal steel nut glued to the top as the load support. The top panel had a 63 mm square (the same dimensions as the load cell itself) steel plate fixed to it directly above each load cell as load spreading support. The hexagonal support nut locates to the centre of each spreader plate.

Part Specifications:
Zemic load cell: L6P-C3-45 kg-1.5P, Part Number: 6012306
Zemic Transmitter: Top-Sensors T1 weight transmitter analog/dig DIN rail, Part Number: 990099.
Test Prototype Build and Set Up All 12 load cells were delivered with 1.5 m wires for connection, wires were checked so that all 12 load cells had the same length of wires. Each load cell was individually checked according to the manufacturer's specification for resistance value and then calibrated. The load cells were soldered in parallel to a circuit board according to instructions from Zemic and a single set of outputs was taken from the circuit board into the T1 controller. Each individual load cell was calibrated and the T1 controller calibrated for the system using values for all the load cells. A single 12 mm plywood base panel was cut, with dimensions 1800 mm×500 mm. The positions of load cells for each layout were marked accurately on the base panel. A single 6 mm MDF top panel was cut, with dimensions 1800 mm×500 mm. The positions of load spreader plates for each layout were marked accurately on the top panel. 6 mm Plywood load cell supports were glued to the underside of each load cell. Metal hex load supports were glued to the top of each load cell. For each layout to be tested the load cell assemblies and spreader plates were stuck in position using re-positionable double sided tape.

Each layout was tested with a known load (person) which weighed approximately 85 kg. The weight of the person used with layout 1 was slightly more than the weight of the person used with layout 2 and 3. Actual accurate weights of the subject were measured using NAWI calibrated scales prior to each test. For each layout and calibrated load, a test was performed three times in 4 different positions (the four different loadings illustrated in FIGS. 12A to 12D) on the patient transfer board and the average of the measured weights recorded. Each layout was tested on a hard substrate (carpeted floor) and on a soft substrate (mattress) and results recorded.

Test Results for Hard Substrate

Table 1 shows the test results for testing the patient transfer boards of FIGS. 8 to 10 on a hard substrate (carpeted floor). Layout 1 shows the best results with an average variance across all load tests of 0.14%. While Layout 2 had an average variance of 0.91% and Layout 3 an average variance of 0.65%. Layout 2 did not return reliable results for the load condition where the load was in one corner of the scales, this was due to the fact that the top and bottom panels touched each other and the load cell assembly could not find a resting measurement value.

Test Results for Soft Substrate

Table 2 shows the test results for testing of the patient transfer boards of FIGS. 8 to 10 on a soft substrate (Mattress). Layout 1 shows the best results with an average variance across all load tests of 0.19%, while Layout 3 had an average variance of 0.20%. Layout 2 was not useful as it was impossible to get results for two of the positions. The two which did produce results showed an average variance of 1.98%.

CONCLUSIONS

Layout 1 is the best for accuracy on both hard and soft substrates.

Layout 2 does not return reliable results for some load conditions and as such would not pass regulatory test requirements.

Layout 3 demonstrates a larger difference in average variance than Layout 1 between hard and soft substrates.

Layout 1 provides stable and consistent results across different substrates.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following Claims.

The invention claimed is:

1. An apparatus to weigh a patient comprising:
 a patient transfer board configured to support a patient in a supine position, wherein an upper surface of the patient transfer board has a width and a length and is configured to receive the patient in the supine position, the patient transfer board comprising a plurality of transducers provided beneath the upper surface, the plurality of transducers configured to determine a weight of the patient; and
 summing means configured to provide a summed weight sensed by the plurality of transducers, wherein
 the plurality of transducers comprises at least 8 transducers, and each transducer is 300 mm or less from another of the plurality of transducers;
 the plurality of transducers are provided at three or more positions across the width of the patient transfer board; and
 70% or more of the plurality of transducers are provided within 30% of the width closest to each side of the patient transfer board or within 10% of the length closest to each end of the patient transfer board.

2. The apparatus of claim 1, wherein around 60% of the plurality of transducers are provided 150 mm or less from the outer boundary of the patient transfer board.

3. An apparatus to weigh a patient comprising:
 a patient transfer board configured to support a patient in a supine position, wherein an upper surface of the patient transfer board has a width and a length and is configured to receive the patient in the supine position, the patient transfer board comprising a plurality of transducers provided beneath the upper surface, the plurality of transducers configured to determine a weight of the patient; and
 summing means configured to provide a summed weight sensed by the plurality of transducers, wherein
 at least one transducer in the plurality of transducers is provided beneath every unit area of an area of the patient transfer board configured to receive the patient in the supine position,
 the unit area corresponds to 90,000 mm$^2$,
 the plurality of transducers are provided at three or more positions across the width of the patient transfer board;
 70% or more of the plurality of transducers are provided within 30% of the width closest to each side of the patient transfer board or within 10% of the length closest to each end of the patient transfer board.

4. The apparatus of claim 3, wherein the plurality of transducers comprises 14 to 18 transducers.

5. The apparatus of claim 3, wherein the plurality of transducers are provided at five or six positions across the width of the patient transfer board.

6. The apparatus of claim 3, wherein the plurality of transducers are provided at eight to ten positions along the length of the patient transfer board.

7. The apparatus of claim 3, wherein the upper surface of the patient transfer board has an associated flexural modulus of from at least 8 GPa to less than 25 GPa.

8. The apparatus of claim 1 configured for use with an adult human, the apparatus having an associated accuracy of +/−300 g, a weight of less than 11 kg and a maximum thickness of less than 5 cm.

9. The apparatus of claim 8, wherein the associated accuracy is +/−150 g, the weight is less than about 8 kg and the maximum thickness is around 2.5 cm.

10. The apparatus of claim 8, wherein the plurality of transducers comprises 14 to 18 transducers.

11. A kit of parts comprising the apparatus of claim 1, and instructions for use.

12. The apparatus of claim 1, wherein the plurality of transducers comprises 14 to 18 transducers.

13. The apparatus of claim 1, wherein the plurality of transducers are provided at five or six positions across the width of the patient transfer board.

14. The apparatus of claim 1, wherein the transducers are provided at eight to ten positions along the length of the patient transfer board.

15. The apparatus of claim 1, wherein more than 50% of the transducers are provided 150 mm or less from an outer boundary of the patient transfer board.

16. The apparatus of claim 1, wherein each transducer is around 270 mm or less from another transducer.

* * * * *